United States Patent

[11] 3,555,192

[72] Inventor Robert L. Hymer
Houston, Tex.

[21] Appl. No. 839,941
[22] Filed July 8, 1969
[45] Patented Jan. 12, 1971
[73] Assignee The United States of America as represented by the Administrator of the National Aeronautics and Space Administration

[54] AUDIO SIGNAL PROCESSOR
4 Claims, 7 Drawing Figs.

[52] U.S. Cl. .......... 179/1
[51] Int. Cl. .......... H04b 15/00
[50] Field of Search .......... 179/1VC, 100.1VC; 323/96, 66; 325/8, 11, 408, 403, 402, 400, 399

[56] References Cited

UNITED STATES PATENTS

| | | | |
|---|---|---|---|
| 2,817,014 | 12/1957 | Bevoort et al. .......... | 340/148 |
| 3,012,137 | 12/1961 | Rileman .......... | 325/408 |

*Primary Examiner*—Kathleen H. Claffy
*Assistant Examiner*—J. B. Leaheey
*Attorneys*—Marvin F. Marnock, Marvin F. Matthews and G. T. McCoy

ABSTRACT: The output signal from a microphone is fed through a preamplifier to a variable attenuator and then to an automatic volume control (AVC) circuit. A voice operated switch is connected between the output of the microphone preamp and the attenuator and activates the latter when the output signal from the preamp falls below a predetermined minimum amplitude to introduce signal attenuation at the same rate as gain is increased in the automatic volume control circuit to thereby eliminate induced noise surges during periods of silence or low amplitude input into the microphone.

Robert L. Hymer
INVENTOR

BY [signature]
[signature]
ATTORNEYS

AUDIO SIGNAL PROCESSOR

B. BACKGROUND OF THE INVENTION

1. Field of the Invention

The present invention relates generally to the field of automatic signal processing. More specifically, the present invention relates to new and improved means for improving noise immunity and eliminating background noise surges in audio systems introduced by automatic volume control circuits during speech pauses or other periods of low amplitude audio input.

The present invention is specifically contemplated for use in the Apollo space program for communication with Apollo astronauts, however, its general applicability to the field of communications will be appreciated.

2. Brief Description of the Prior Art

In various applications in the communications field, it is desirable to maintain a relatively constant system output level irrespective of input level variations or variations introduced by the system itself.

As an example, audio gain control in broadcasting is required to maintain signal input level to the transmitter at the highest value possible without overmodulating the carrier and the prior art has disclosed various means for maintaining constant output levels in such systems including automatic volume control (AVC) circuits which compensate for input signal amplitude variations.

In principle, the AVC provides a relatively constant output level by automatically increasing the gain of an amplifier as the amplitude of the input signal decreases and decreases the gain as the input amplitude increases. Such systems are satisfactory where the amplitude of the input signal varies between certain limited values and where there are no sustained periods of relatively low amplitude inputs.

An automatic volume control system is not, however, completely suited for speech communication since the no-speech intervals common in normal speaking are treated by the automatic volume control as low level inputs. During such speech pauses, the gain of the amplifier in the AVC circuit is automatically increased until input noise is amplified to the output level normally present during speech intervals. The net result is that low level background noise is greatly amplified during speech pauses resulting in undesirable output surges. Such noise surges are particularly undesirable where audio communication is required over the large distances common in space travel. Moreover, where a number of crewman in a spacecraft are employing the same audio system, the input noise level of each microphone is combined in the system output making intercom and broadcast communication extremely difficult.

The use of voice operated switches (VOX) in conjunction with automatic volume controls has been suggested by the prior art as a means for preventing noise amplification during no-speech intervals. In such combined VOX/AVC systems, the VOX is normally designed to completely suspend signal input to the AVC amplifier whenever the amplitude of the audio input to the system falls below a predetermined minimum value corresponding to a speech pause. When speech resumption is detected by the VOX, the signal is switched into the AVC input to reinitiate automatic volume control of the output signal.

Noise immunity in the conventional VOX/AVC system is accomplished by setting the detection threshold level for the VOX above the background noise level and below the level of normal speech. The resulting system function is, of necessity, however, only a compromise since immunity to background noise also prevents the VOX from detecting a low amplitude information input following a no-speech period with a consequent loss of the signal.

In an attempt to make the conventional VOX/AVC system immune to high amplitude, short duration impulse noise, such as that occurring when the microphone is bumped, a delay is introduced to prevent operation of the VOX until a sustained high amplitude signal appears at the input for a predetermined period of time. However, the delay between the signal input and VOX operation generally referred to as attack time, is accompanied by an undesirable loss of the initial portion of an information input signal following a pause while the VOX is in its "off" state. The prior art has attempted to prevent noise surge and to shorten attack time while maintaining adequate noise immunity. Such attempts have generally included relatively complex means such as circuits for memorizing the gain of the signal preceding a speech pause and circuits for comparing voice-versus-noise crest factors. Because of their inherent complexity, these circuits are undependable and even when fully operative are often ineffective in applications where noise spectra varies with time.

To the extend that the prior art is known to the applicant, there is presently no audio processing system which is capable of providing adequate noise immunity without also introducing some signal loss during attack time of the VOX.

C. SUMMARY OF THE INVENTION

The amplified output from a microphone is conveyed to a variable attenuator with the attenuator output being fed to a conventional automatic volume control (AVC) circuit. The input for a voice operated switch (VOX) is derived from the amplified microphone output to detect the presence of speech input to the variable attenuator and to control attenuator operation during no-speech intervals. When the speech input to the system is halted for a predetermined period of time, the VOX activates the variable attenuator which attenuates the output signal from the fixed gain amplifier at approximately the same rate as the AVC gain increases. The increased gain added by the AVC is thus offset by the gain reduction introduced by the variable attenuator to prevent noise surge during no-speech intervals. Subsequently, when speech resumes, the VOX suspends operation of the variable attenuator which reduces signal attenuation to zero within a finite time interval referred to as the attenuator's attack time. This attenuator attack time is designed to be as close as possible to the attack time of the AVC whereby the AVC automatically adjusts its gain downwardly at the same rate as signal attenuation is reduced to maintain a constant system gain.

Immunity to false noise triggering is effected by setting the detection threshold for the VOX above the ambient noise level and a slight delay is provided in the VOX "turn-on" to further prevent false triggering by high amplitude, short duration impulse noise.

Since the VOX operation never completely attenuates the signal as in conventional systems, there is no signal loss during the VOX "turn-on" period. Moreover, the inverse correspondence between the attenuation rate of the variable attenuator and the gain rate of the AVC eliminates noise surge during no-speech intervals and ensures constant system gain during the "turn-off" and "turn-on" periods immediately following speech pause and speech resumption.

By the means described, it may therefore be appreciated that the present invention is capable of providing effective automatic volume control without noise surge during speech pause and without initial loss of signal when speech is resumed. Other features and advantages of the present invention will become apparent from the following description and claims.

D. BRIEF DESCRIPTION OF THE DRAWINGS

E. DESCRIPTION OF THE PREFERRED EMBODIMENT

Figure 1:
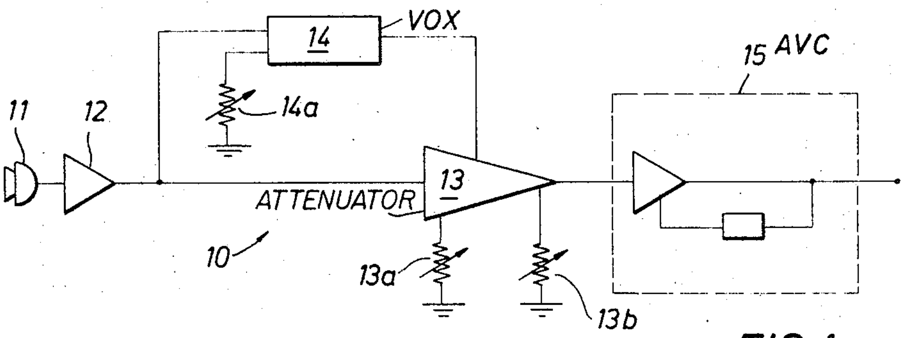
FIG. 1 is a schematic block diagram of the apparatus of the present invention.

With reference to FIG. 1 of the drawings, the audio signal processor of the present invention is indicated generally at 10 and includes a microphone 11 having its output connected to a preamplifier 12. The amplified signal from the preamp 12 is conveyed to a variable attenuator 13 and to a voice operated switch (VOX) 14. The output from the attenuator 13 is conveyed to an automatic volume control circuit (AVC) 15 which in turn conveys the signal to additional interface circuitry (not illustrated) such as a radio broadcast transmitter.

Audio input to the microphone 11 is transduced to a low power electrical signal which is amplified by the preamp 12 in a conventional manner. When an input signal having the desired amplitude is present at the output of preamp 12, the VOX 14 forms an appropriate output signal which prevents the variable attenuator 13 from introducing any signal attenuation. The output signal level from the attenuator 13 thus remains the same as its input signal level during speech input and the AVC 15 maintains constant volume control in the conventional manner.

When speech is suspended, the VOX 14 immediately detects the signal absence and if no speech is initiated within a fixed time interval, as for example 1 second, the VOX forms an output signal to initiate operation of the variable attenuator 13. Once activated, attenuation is introduced by the attenuator 13 at the same rate as gain is increased in the AVC 15 resulting in a cancellation of system gain during the sustained no-speech interval. The delay in VOX operation prevents activation of the attenuator 13 during normal, short duration pauses which occur in sustained speech. The attenuation rate of the variable attenuator 13 is matched to the gain rate of the AVC 15 by means of the variable resistor **13*a* with maximum signal attenuation being adjusted with a variable resistor 13*b* to match the maximum gain of the AVC 15. By correlating the function of the attenuator 13 with that of the AVC 15** in the described manner, system gain cancellation is ensured over the full dynamic range of the two components during speech pause.

When speech is initiated after a pause, the VOX 14 immediately detects the signal presence and, after a momentary delay, forms an output which causes the variable attenuator 13 to reduce signal attenuation to zero within a finite period of time referred to as its attack time. During this transient switching off period, the attenuator 13 reduces signal attenuation at a rate equal to the rate of gain reduction (attack time) of the AVC 15 and exact gain cancellation is thus effected. The delay in VOX operation is provided to prevent false VOX triggering caused by short duration, high amplitude impulse noise. Noise immunity may be further ensured by adjusting the detector threshold of the VOX 14 below speech level and above noise level by means of a variable resistor **14*a*** to prevent false VOX triggering by background noise during speech pause.

Figure 2:
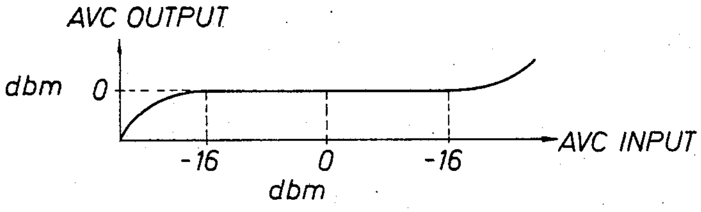
FIG. 2 is a graph of AVC input versus output.

FIG. 2 illustrates an exemplary gain curve 16 which is typical for a conventional AVC such as the AVC 15. The horizontal axis of the graph represents AVC input in dbm. while the vertical axis represents AVC output in dbm. During stabilized speech, the AVC 15 is preferably operated with a nominal zero dbm. input with a resulting output of zero dbm. In accordance with the operation of a conventional AVC, any input to the AVC 15 which is between approximately −16dbm. and +16dbm. will produce a constant output of approximately 0 dbm.

Figures 3A, 3B, 3C, 3D, 3E:
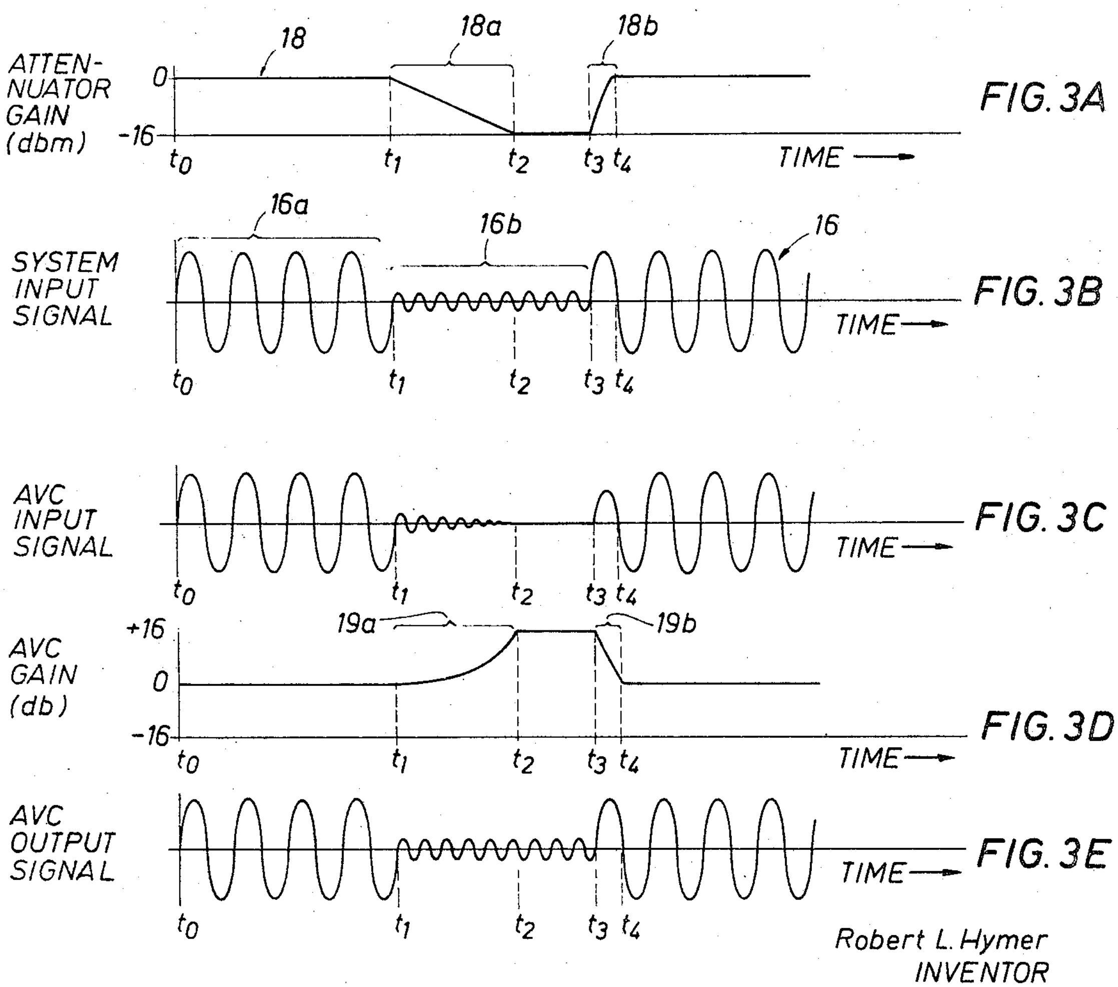
FIG. 3A is a graph of variable attenuator gain as a function of time for a given signal input.
FIG. 3B is a representation of an exemplary signal to the system of the present invention illustrating speech and no-speech intervals.
FIG. 3C is a representation of the signal of FIG. 3B as it appears at the variable attenuator output and the AVC input.
FIG. 3D is a graph of AVC gain as a function of time for the input signal illustrated in FIG. 3C.
FIG. 3E is a representation of the signal illustrated in FIG. 3C as it appears at the output of the AVC.

FIGS. 3A—3E illustrate the operation of the signal processor 10 with an exemplary input signal 16 illustrated in FIG. 3B which includes a series of high and low amplitude signal excursions **16*a* and 16*b* respectively. Excursions 16*a* correspond to speech input while the excursions 16*b* correspond to ambient noise level which is present during speech pause. Curve 18 in FIG. 3A represents attenuation-versus-time for the variable attenuator 13 and illustrates 0 dbm. gain from time $t_0$ to time $t_1$ during sustained speech input to the system. At time $t_1$, speech is halted and the amplitude of input signal 16 is reduced leaving only ambient noise signals 16*b*. When speech pause is detected by the VOX 14, the attenuator 13 is activated at time $t_1$ to attenuate the noise signal 16*b* at the rate set by variable resistor 13*a* and at the rate illustrated by section 18*a* of curve 18 in FIG. 3A. Attenuation is added until the fixed value of attenuation set by variable resistor 13*b* is reached at time $t_2$. For purposes of illustration, the maximum attenuation has been shown as −16dbm. in FIG. 3A. From time $t_1$ to $t_2$, referred to as the decay time for the attenuator 13, the noise signal is attenuated to −16db. and remains at that level until time $t_3$ when speech is again initiated. Upon speech resumption at time $t_3$, the VOX 14 signals the attenuator 13 which reduces signal attenuation to 0 db. by time $t_4$ as illustrated by the curve section 18b. The interval between time $t_3$ and $t_4$, known as the attack time for the attenuator 13**, is relatively short and only the initial portion of the speech signal following speech pause is attenuated and after time $t_4$, no attenuation is introduced.

The signal output from the variable attenuator 13 (AVC) input) is illustrated in FIG. 3C and clearly indicates increasing attenuation of the noise signal **16*b*** from time $t_1$ to time $t_2$ with full attenuation from time $t_2$ to time $t_3$ and slight attenuation of the speech signal from time $t_3$ to time $t_4$.

FIG. 3D illustrates the gain curve of AVC 15 with respect to time for an AVC having the gain curve illustrated in FIG. 2. From time $t_0$ to time $t_1$, corresponding to the first period of sustained speech, the AVC gain remains constant at 0 db. Between times $t_1$ and $t_2$, corresponding to the speech pause, the AVC gain illustrated as curve section **19*a***, increases upwardly from 0 db. to +16 db. as it attempts to increase the system output to the desired 0 dbm. The resulting system output noise signal illustrated in FIG. 3E is thus amplified at the same rate it had been attenuated to produce a noise signal which is the same as the system input signal illustrated in FIG. 3B.

At time $t_3$, corresponding to speech return, the AVC gain (curve **19*b***) drops rapidly to 0 db. at time $t_4$. During the AVC attack time, interval from $t_3$ to $t_4$, the initial portion of the speech signal is slightly overamplified which compensates for the previous overattenuation of this portion of the signal by the attenuator 13.

It will be appreciated that maximum effectiveness is achieved when the attenuation curves **18*a* and 18*b* exactly offset the effect of the gain curves 19*a* and 19*b*, respectively. It should also be noted that while it is possible to effect almost instantaneous changes in the gain of the attenuator 13 and AVC 15, the slower changes illustrated by curve sections 18*b* and 19*b*** are preferable since undesirable system "clicks" are often associated with extremely fast gain changes.

In the practical application of the invention 10, the microphone amplifier 12, VOX 14 and variable attenuator 13 may be implemented as a unit within a microphone assembly or the individual components may be separately contained and interconnected as illustrated in FIG. 1.

The foregoing disclosure and description of the invention is illustrative and explanatory thereof, and various changes in the size, shape and materials as well as in the details of the illustrated construction may be made within the scope of the appended claims without departing from the spirit of the invention. By way of example rather than limitation, it will be understood that while the present invention has been described with reference to signal amplitude as the critical variable, the system could also be employed to process another signal variable such as frequency. It should also be understood that terms such as "attenuator" and "attenuation" are relative and may refer to the gain increase derived from a variable gain amplifier. The preamplifier 12 illustrated in FIG. 1 may be eliminated if desired and forms no part of the present invention. Similarly, a signal source other than the microphone 11 may be employed without departing from the scope of the present invention. It will also be understood that while the VOX 14 and variable attenuator 13 have been illustrated as separate components, the described function of each may be produced by one component or a plurality of cooperating components.

I claim:

1. An electrical signal processor comprising:

a. a system input means for receiving variable value electrical signals;

b. detector means for detecting the absence of an electrical signal having a predetermined value at said system input;

c. attenuator means having an attenuator input means connected to said system input and being operable by said detector means for variably attenuating the electrical signal appearing at said system input and forming said attenuated signal on an attenuator output means when said detector means detects the absence of an electrical signal having said predetermined value and for transmitting said signal appearing at said system input to said attenuator output means without attenuation when said detector means detects the presence of an electrical signal in excess of said predetermined value; and d. automatic signal value control means including an automatic volume control circuit connected to said attenuator output means for automatically forming a fixed value output signal irrespective of value variations within a predetermined range in said signal appearing on said attenuator output means, said attenuator means being operable to attenuate at a rate equal to the gain rate of said automatic volume control circuit for preventing noise surges in the intervals when said system input signal value is below said predetermined value, said detector means including an electrical switch means operable in response to the presence of voice sounds for delaying the attenuation function of said variable attenuator means for a predetermined period of time following detection of the absence of said predetermined value signal at said system input and said switch means being operable for preventing the suspension of attenuation at said system input for a predetermined period of time to prevent sounds triggering from impulse noise; and detector adjustment means for adjusting the signal threshold level required for operation of said switch means to increase its noise immunity.

2. The signal processor as defined in claim 1 wherein:

a. said detector means includes means for detecting the presence at said system input of electrical audio signals above a predetermined amplitude corresponding to speech input and the absence of signals above such predetermined amplitude corresponding to no-speech input;

b. said switch means includes means for forming a first control output signal when speech level amplitude signals appear at said system input and for forming a second control output signal when speech level amplitude signals are absent from said system input;

c. said first and second control output signals being conveyed by conductor means to said variable attenuator means;

d. means operable by said first and second control output signals included in said attenuator means to suspend the attenuation function of said variable attenuator means when said first control output signal is formed and means for activating said variable attenuator function when said second control output signal is formed;

e. said automatic volume control means maintains a substantially constant amplitude output signal over a fixed range of input amplitudes;

f. said attenuator means includes a maximum attenuation value which is equal to the maximum gain value of said automatic volume control means;

g. said attenuator means reduces attenuation at the same rate as said automatic volume control means increases gain following a period of no-speech input to said system input to cancel initial system gain following suspension of said variable attenuation function;

h. said switch means being operable for preventing the formation of said second control output signal for a predetermined period of time following the loss of speech level amplitude signals at said system input to prevent signal attenuation by said variable attenuator during short duration pauses in speech level system input; and i. said switch means being operable for preventing formation of said first control output signal for a predetermined time following speech level amplitude signal detection for preventing suspension of signal attenuation by said attenuator means following short duration, impulse noise input to said system input.

3. The signal processor as defined in claim 1 wherein said attenuator means includes:

means for adjusting the attenuation rate of said attenuator means; and means for adjusting the maximum value of attenuation introduced by said attenuator means.

4. The signal processor as defined in claim 1 further including:

a. a microphone for transducing sound energy to an electrical signal output; and b. a preamplifier connected to said microphone for amplifying the electrical signal output of said microphone and supplying said amplified signal to said system input.